United States Patent Office 2,920,975
Patented Jan. 12, 1960

2,920,975

FUGITIVE COLORATION

John E. Livak, Clemson, S.C., assignor to Deering Milliken Research Corporation, Pendleton, S.C., a corporation of Delaware No Drawing. Application November 3, 1955
Serial No. 544,835

7 Claims. (Cl. 106—305)

This invention relates to compositions for the fugitive tinting of organic non-cellulosic textile materials and is a continuation in part of U.S. application, Serial Number 203,215, filed December 28, 1950, now abandoned.

The fugitive tinting of organic non-cellulosic textile materials presents special problems and this is particularly true of materials containing certain synthetic fibers. For example, nylon yarns are generally subjected to a heat-setting operation to set the twist therein and if the nylon is tinted prior to this operation, the color becomes more or less permanently fixed and is not removed by subsequent finishing operations. Special reducing or oxidizing treatments are then necessary to remove the tint from the nylon fibers. Even tints which are completely fugitive to nylon, when the tinted material is not subjected to high temperatures, become permanent when the nylon is heat-set so that dyes or the like suitable for the tinting of nylon materials are limited in number.

It has previously been suggested that the ultramarine pigments might be satisfactorily employed without permanent discoloration on nylon fabrics which are subjected to heat-setting, but the use of such pigments presents a special problem, since the ultramarines are substantially water insoluble and cannot be used in solution form. It is, therefore, necessary that an aqueous dispersion of the ultramarine pigment be employed.

Prior the present invention, it has been impossible to prepare a dispersion of an ultramarine pigment having sufficient stability to be satisfactorily employed as a fugitive tint in a conventional manner and this has severely limited the use of such pigments. It is conventional to prepare sufficient tinting solution or the like to last for a period of several days and to withdraw smaller quantities of the tint as needed. The use of an unstable dispersion requires that fresh dispersions be prepared several times a day or else it requires that facilities for redispersing the pigment immediately prior to its use be readily available. Further, it is generally necessary that the smaller quantity of the unstable pigment dispersion contained in the tint applicator be agitated in order to obtain an even application, so that it can be seen that the use of an unstable pigment dispersion as a fugitive tint has several severe disadvantages.

It is an object of this invention to provide aqueous dispersions of ultramarine pigments which are stable for long periods of time and which are suitable for the fugitive tinting of organic non-cellulosic textile materials.

According to this invention there is provided an aqueous dispersion of an ultramarine pigment comprising from about 25% to 75%, by weight of the ultramarine pigment, of a water soluble salt selected from the group consisting of sodium sulfate, sodium silicate, sodium sulfite and sodium formate, and from about 50% to 200%, by weight of the ultramarine pigment, of a fatty acid-sodium soap. That the use of an inorganic salt with a sodium soap could result in a stable emulsion is indeed surprising in view of the known fact that inorganic salts generally act to break emulsions or dispersions and are conventionally employed to precipitate materials from solution. The reason or reasons that in the present instance the inorganic salts exert a stabilizing influence are not fully known or understood, but the stabilizing influence is presently believed to be the result of a common ion effect. This, however, is only theory and applicants do not wish to be limited thereby.

Any of the well known ultramarine pigments can suitably be employed in the preparation of the new dispersions of this invention, and typical examples of suitable pigments include ultramarine blue, ultramarine red, ultramarine green and ultramarine violet. These pigments are in each instance commercially available materials. The amount of the inorganic pigment to be employed depends primarily on the depth of shade desired and solutions having a concentration of ultramarine pigment of from about 1% to 20% by weight can satisfactorily be prepared. Generally, however, the most stable dispersions result when the concentration of ultramarine pigment is from about 2% to 10% by weight.

The amount of inorganic salt to be employed in the preparation of the new compositions of this invention can be varied within reasonably wide limits although if too little or too much of the inorganic salt is employed, the stability of the emulsion is not as great as might be desired. As a general rule a reasonably stable emulsion can be prepared using from about 25% to 75%, by weight of the ultramarine pigment, of the inorganic salt but best results are generally obtained when the weight of the inorganic salt is from about 30% to 60% of the weight of pigment. Any of the inorganic salts listed above can satisfactorily be employed but sodium sulfate is generally preferred.

Any of the well known and commercially available fatty acid sodium soaps can suitably be employed in forming the new dispersions and specific illustrative examples of suitable soaps include sodium palmitate, sodium oleate, sodium stearate or mixtures of the same. Sodium oleate is generally preferred for reasons of convenience. The amount of soap to be employed can be varied within reasonably wide limits and a weight of soap equal to from about 50% to 200% of the weight of ultramarine pigment will generally give satisfactory results. For the greatest degree of stability, however, the soap is preferably employed in amounts of from about 75% to 150% by weight of the ultramarine pigment.

The new dispersions of this invention can be employed for the fugitive tinting of any organic non-cellulosic textile material as illustrated by wool, nylon, polyacrylonitrile fibers such as sold under the trade names of Orlon and Acrilan, polyester fibers such as those prepared from terephthalic acid and ethylene glycol and sold under the name of Dacron and mixtures of such materials. The new dispersions are particularly advantageous for use on the synthetic hydrophobic fibers and, as previously mentioned, even when such materials are subjected to steaming at high temperatures, the tint can be removed therefrom by a simple scouring operation. Ultramarine blue is an especially valuable tinting material in this respect since the color is completely destroyed in acid media and a slightly acid scour can be employed to remove even the last traces of residual color.

The tinting dispersion can be applied in any suitable or conventional manner. For example, the dispersion can be sprayed on loose staple fibers, applied by brushing to either fibers or yarn, or can be applied by passing yarn over a wick applicator. If desired, the dispersions can be diluted, at the time of use, to any suitable concentration without destroying the stability of the dispersions to the extent that they break while being applied and, if desired, conventional penetrants, lubricants and sizes can also be included in the tinting dispersion.

When ultramarine blue is employed as a tint on wool or blends of wool with non-cellulosic fibers, it is necessary to keep the tinting solution on the alkaline side. This is because wool is acidic in nature and when a neutral tinting dispersion containing ultramarine blue is sprayed on the wool, the acidic nature of the wool slowly effects decolorization of the pigment. A satisfactory procedure comprises adding to the tinting dispersion a mild alkali, such as sodium carbonate, in sufficient quantities to overcome the acidity of the wool, so that the color remains visible until it is removed by scouring. This procedure is necessary, however, only when employing ultramarine blue on wool or wool blends and when other ultramarine pigments are employed, or when ultramarine blue is employed only on synthetic fibers, neutral tinting solutions are quite satisfactory.

The invention will now be illustrated by the following specific examples in which all parts are by weight unless otherwise indicated.

*Example I*

In 50 parts by weight of water there is dissolved 5 parts by weight of sodium sulfate and to the resulting solution there is added 10 parts of a finely pulverized ultramarine blue pigment. There is then added 200 parts of a 5% by weight solution of sodium oleate and the resulting mixture is agitated sufficiently to obtain complete dispersion of the pigment. This mixture is suitable for use without dilution as a fugitive tint or if desired can be diluted to any desired concentration at the time of application. It is stable for at least a period of weeks and in an actual test on a dispersion prepared in the manner described, no visible break was apparent in a quantity of the dispersion which was allowed to sit for a period of three weeks without agitation.

With satisfactory results, one can substitute an equivalent quantity of ultramarine red or ultramarine green for the ultramarine blue employed above. Likewise, one can substitute an equivalent quantity of sodium silicate, or other inorganic salt of the class previously defined, for the sodium sulfate employed above, or one can substitute an equivalent quantity of sodium stearate, or other sodium soap, for the sodium oleate employed in the above example.

*Example II*

To show the stabilizing influence of an inorganic salt such as employed in the first example, 10 parts by weight of the ultramarine blue pigment employed in Example I are added to 50 parts by weight of water and to the resulting mixture there is added 200 parts of a 5% by weight sodium oleate solution. The resulting mixture is agitated, as in the first example, to result in the ultramarine pigment being completely dispersed, and the resulting dispersion is thereafter allowed to stand at room temperature without agitation. In an actual test, a dispersion prepared according to this procedure displayed a noticeable break after only about 5 minutes and was completely stratified in less than one hour. Inasmuch as the dispersion of this example was prepared in a manner identical to that of the previous example except for the omission of the inorganic salt, the stabilizing effect of the salt is quite apparent.

*Example III*

The solution of Example I is diluted 300% with tap water and applied by spraying to 100% nylon staple. The staple is stained a distinguishing blue color. The staple is thereafter formed into a nylon taffeta fabric and is finished in a conventional manner which includes scouring in soap and water. The finished fabric is examined and found to be completely devoid of residual tint.

Having thus described my invention, what I desire to claim and secure by Letters Patent is:

1. As a new composition, an aqueous dispersion of an ultramarine pigment comprising from about 25% to 75%, by weight of the ultramarine pigment, of a water soluble salt selected from the group consisting of sodium sulfate, sodium silicate, sodium sulfite and sodium formate, and from about 50% to 200%, by weight of the ultramarine pigment, of a fatty acid-sodium soap.

2. A composition as in claim 1 wherein the inorganic salt is sodium sulfate.

3. A composition as in claim 2 wherein the sodium soap is sodium oleate.

4. A composition as in claim 1 wherein the ultramarine pigment is an ultramarine blue pigment.

5. As a new composition, a 2% to 10% by weight aqueous dispersion of an ultramarine pigment containing between about 30% to 60%, by weight of the ultramarine pigment, of a water soluble salt selected from the group consisting of sodium sulfate, sodium silicate, sodium sulfite and sodium formate, and from about 75% to 150%, by weight of the ultramarine pigment, of a fatty acid-sodium soap.

6. A composition as in claim 5 wherein the inorganic salt is sodium sulfate and the sodium soap is sodium oleate.

7. A composition as in claim 6 wherein the ultramarine pigment is an ultramarine blue pigment.

References Cited in the file of this patent

UNITED STATES PATENTS

| | | |
|---|---|---|
| 2,207,696 | Robinson | July 9, 1940 |
| 2,564,225 | Mayers | Aug. 14, 1951 |
| 2,623,834 | Armitage | Dec. 30, 1952 |

OTHER REFERENCES

"Colour Index," by F. M. Rowe, pub. by the Society at the General Office, Bradford, Yorkshire, England, page 310.